United States Patent [19]

Giebel

[11] Patent Number: 5,449,891

[45] Date of Patent: Sep. 12, 1995

[54] OBJECT SENSOR FOR AN OPTICAL SCANNER

[75] Inventor: James Giebel, Northport, N.Y.

[73] Assignee: Symbol Technologies, Inc., Bohemia, N.Y.

[21] Appl. No.: 59,803

[22] Filed: May 10, 1993

[51] Int. Cl.[6] .......................... G06K 7/10; G01V 9/04
[52] U.S. Cl. ................................. 235/462; 250/222.1
[58] Field of Search ....................... 235/462, 467, 472; 250/222.1

[56] References Cited

U.S. PATENT DOCUMENTS

| | | |
|---|---|---|
| 4,766,297 | 8/1988 | McMillan . |
| 4,879,461 | 11/1989 | Phillip ............................ 250/222.1 |
| 5,151,581 | 9/1992 | Krichever et al. . |
| 5,187,361 | 2/1993 | Ishii ................................ 250/222.1 |
| 5,192,857 | 3/1993 | Detwiler .............................. 235/467 |
| 5,216,232 | 6/1993 | Knowles et al. ...................... 235/467 |
| 5,235,167 | 8/1993 | Dvorkis et al. ...................... 235/467 |
| 5,260,553 | 11/1993 | Rockstein et al. .................. 235/462 |
| 5,260,554 | 11/1993 | Grodevant .......................... 235/462 |
| 5,280,162 | 1/1994 | Marwin . |

OTHER PUBLICATIONS

Metrologic Model MS700 Projection Scanner, brochure May, 1990.
SL6700 Visible Laser Diode Scanlamp, ST2000 SMart Stands, Symbolstand Series, Symbol Technologies Catalog, pp. 19-19 (no date given).

Primary Examiner—John Shepperd
Attorney, Agent, or Firm—Fish & Richardson

[57] ABSTRACT

An optical scanning method for reading indicia of a type having regions of different light reflectivity, the method comprising the steps of providing a scanning unit having a field of view in which indicia may be read; providing an object sensor directed at a location within or nearby the field of view of the scanning unit; supporting the scanning unit and object sensor on a movable structure; moving the scanning unit and object sensor in unison with the structure; and electrically connecting the object sensor and scanning unit, including the steps of differentiating an output of the object sensor to provide an electrical signal representative of the degree of change in the amount of reflected light, and activating the scanning unit when there is more than a predetermined change in the differentiated signal, whether that change is from an increase or decrease in the amount of reflected light; wherein when an object that is more or less reflective than the background enters the field of view the scanning unit is activated, causing it to attempt to read indicia on the object.

5 Claims, 5 Drawing Sheets

OBJECT SENSOR FOR AN OPTICAL SCANNER

BACKGROUND OF THE INVENTION

This invention relates to optical scanning, e.g., scanners for reading bar codes.

Targets having indicia of different light reflectivity, such as bar code symbols, have been scanned by directing a laser beam along an optical path to a symbol located in the vicinity of the reference plane lying generally normal to the optical path. The laser light reflected off the symbol is detected by a detector having a finite field of view or scanning field. (The field of view is also referred to as the scanning area, especially in the case of two-dimensional bar code symbols, such as the PDF417.)

In the case of hand-held scanners, a scanner must be manually positioned relative to an object having a symbol in such a way as to ensure that the scanner's scanning field encompasses the symbol (or enough of the symbol to enable its decoding).

In many applications it is desirable to provide hands-free scanner operation, for example, in point-of-sale check-out systems of the type generally found in supermarkets. Hands-free operation is achieved in a number of ways. For example, in the case of point-of-sale check-out systems, it is well-known to mount symbol scanners underneath check-out counters. (See, for example, U.S. Pat. No. 3,978,317.) Portable, hand-held scanners can also be temporarily mounted (e.g., in a mounting stand as is shown in U.S. Pat. No. 4,766,297).

To scan a symbol using fixed-position or temporarily mounted scanner environments, the object having the symbol to be scanned must be manually positioned relative to the fixed-position scanner in order to move the symbol into the scanner's field of view.

It is clearly advantageous to maintain a scanner in a non-scanning (low-power or off) mode when it is not in use. Among other reasons, this reduces power consumption and prolongs the life of the scanner.

In order for a scanner that is in a non-scanning mode to scan and decode a symbol in its field of view, some means of initiating a scanning episode must be provided. (A scanning episode may include, for example, propagating and directing a light beam towards the symbol to be scanned, detecting at least a portion of the light of variable intensity reflected off the symbol over the field of view, generating an electrical signal indicative of the desired light intensity, processing the electrical signal into data descriptive of the symbol being read, and decoding the data to obtain the values which the symbol represents.)

Conventional, hand-held scanners are typically handgun shaped and have a manual trigger for initiating scanning episodes. Some systems may use a two-phase triggering mechanism, in which a first phase is used to aim the scanner's beam at the target symbol and a second phase is used to initiate the scanning episode.

To retain hands-free operation of mounted scanners, it is useful to have an automatic triggering mechanism in order to initiate a scanning episode.

McMillan (U.S. Pat. No. 4,766,297) describes a dual mode stationary and portable scanning system. McMillan's stationary mode places the scanner in a fixed, non-adjustable position in a support fixture, thereby positioning it to have a fixed scanning area. In its stationary mode, the scanner may be triggered by interrupting a beam between two fixed locations on the scanner's support fixture.

A tilting, wall mountable bar code scanner with an adjustable, targetable scanning area is described in the application of Charych, U.S. application Ser. No. 08/059,822, filed on even date herewith, entitled Tilting Wall-Mounted Optical Scanner (incorporated herein by reference). In such a system the target area is not fixed.

SUMMARY OF THE INVENTION

In a first aspect, the invention features an optical scanner in which the scanning unit and an object sensor are supported on a movable structure and move in unison as the structure moves. The object sensor is directed at a location within or near the field of view of the scanning unit. Light reflected back to the object sensor is differentiated to provide an electrical signal representative of the degree of change in the amount of reflected light, and the scanning unit is activated when there is more than a predetermined change in the differentiated signal, whether that change is from an increase or decrease in the amount of reflected light.

In preferred embodiments, a window comparator is used to decide whether the change in the differentiated signal is enough to activate the scanning unit; the object sensor comprises a light source directing a beam at a trigger area and a light sensor receiving light reflected from the trigger area; and the trigger area is within or nearby the field of view of the scanning unit.

The invention offers hands-free operation and automatic triggering of mounted scanners, without restricting, limiting, or fixing their field of view. Hands-free operation is advantageous in that it enables scanners to be used in automated systems and in situations in which manual scanner activation is difficult or impossible. The invention also allows scanners to be maintained in a low-power or off mode except when in use, thereby reducing power consumption. The use of a differentiating circuit makes possible detection of both black and white objects. It can also be made resistant to false triggering, and to the effects of changes in ambient light.

In a second aspect, the invention features providing different scan timeout intervals for two and one-dimensional bar code symbols. If a two-dimensional bar code is detected, the longer scan timeout (e.g., 10 seconds) is used, to provide enough time for the two-dimensional symbol to be decoded. But when a two-dimensional bar code is not detected (and thus it is likely that a one-dimensional bar code is being read), a shorter scan timeout (e.g., 2 seconds) is used. This extends the life of the optical scanning components.

Other features of the invention will be apparent from the following description of preferred embodiments and from the claims.

DESCRIPTION OF THE PREFERRED EMBODIMENTS

Figure 1:
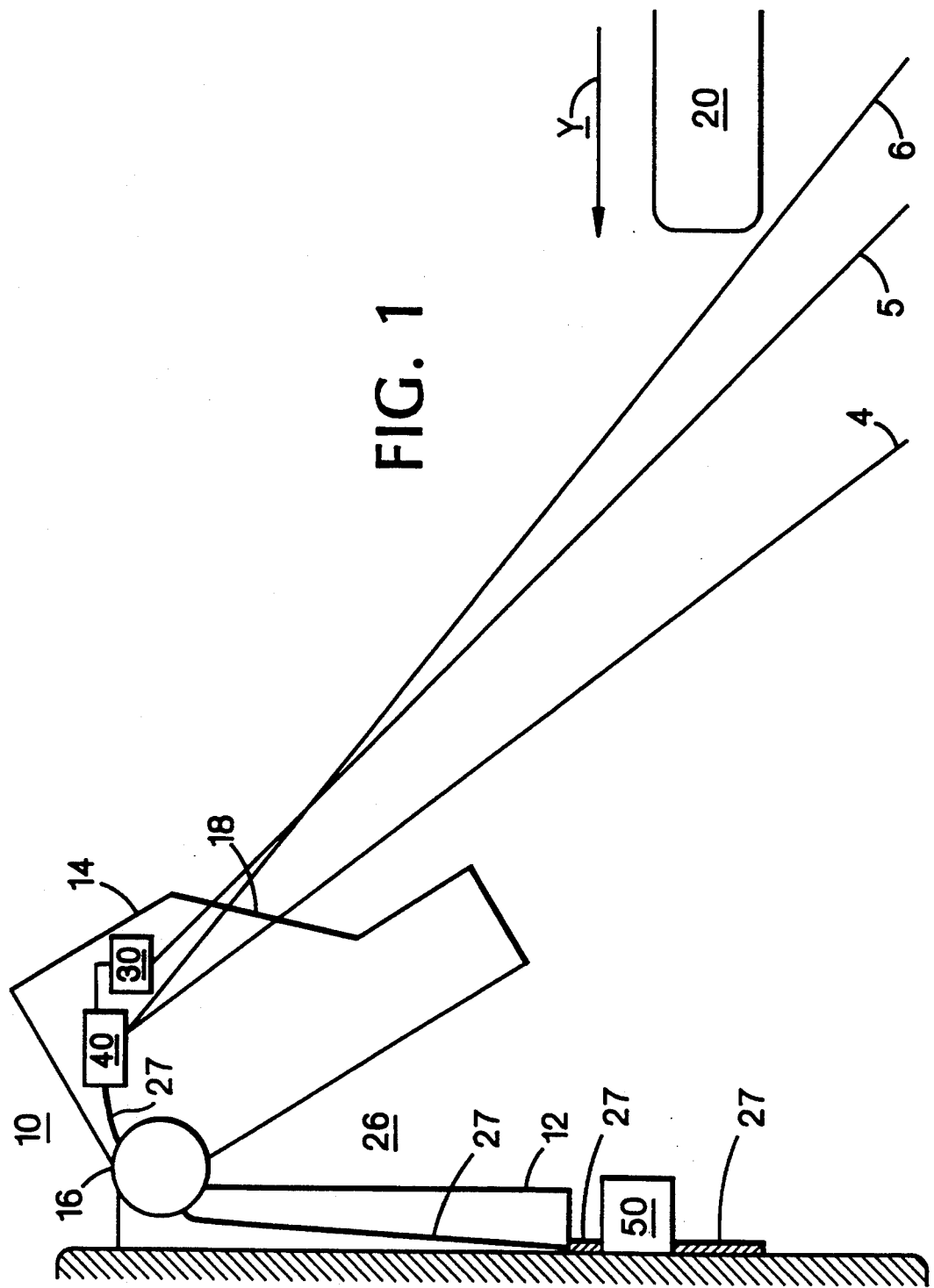
FIG. 1 is an elevation view, somewhat diagrammatic, of the preferred embodiment.

FIG. 1 shows a surface mountable, adjustable tilting bar code scanner 10. The scanner includes a mounting unit 12 connected to an optical scanning unit 14 by means of pivot structure 16. In operation, the entire scanner 10 is mounted on a surface, e.g., a wall, via mounting unit 12. Optical scanning unit 14 contains an electro-optical scanning mechanism 40 and an object sensor 30. A light pattern generated by a laser beam from the scanning mechanism 40 is emitted through a glass covered window 18 on the front sloping surface of scanning unit 14. When the light beam reflects off an object in its path, the reflected light is passed back into scanning unit 14 through window 18 to the scanning mechanism for processing.

The position of scanning unit 14 relative to mounting unit 12 defines a particular field of view or target area for the scanning mechanism through window 18. For example, in the position shown in FIG. 1, the scanner's field of view is the area between the lines 4 and 6. Any symbol in the scanner's field of view may be scanned.

Figure 5:
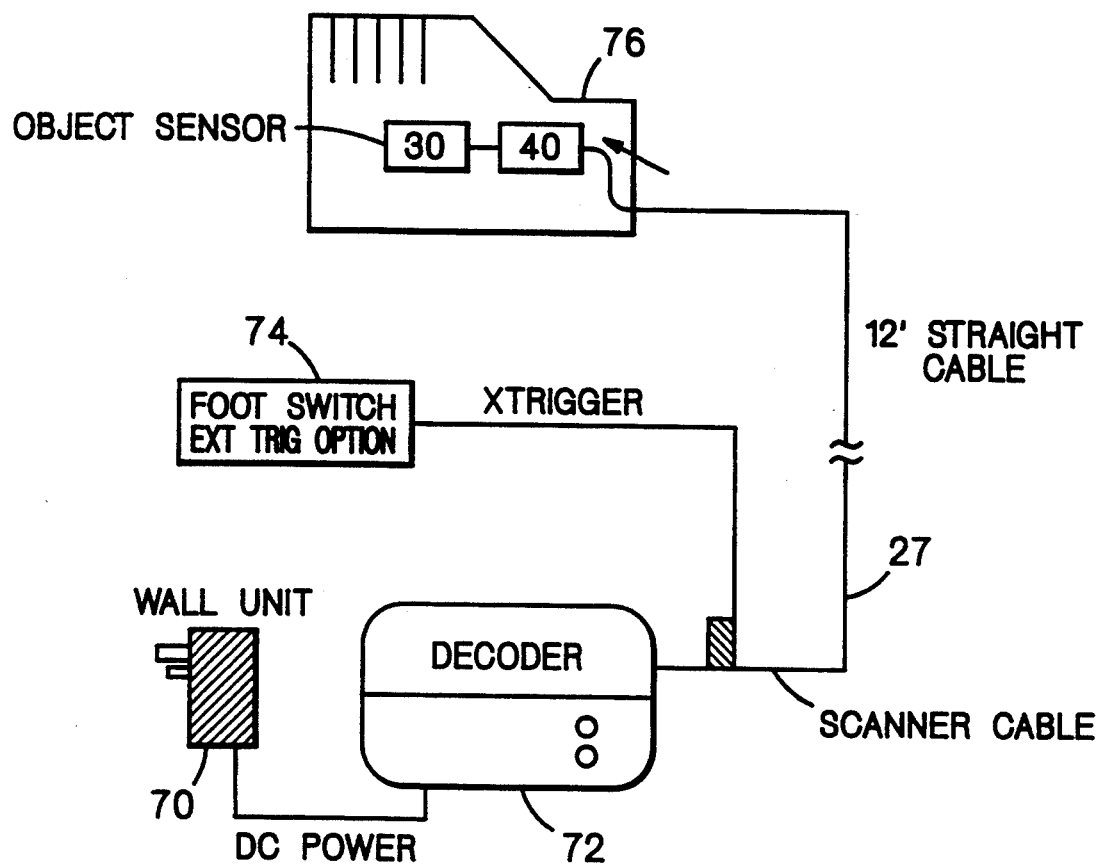
FIG. 5 is a diagrammatic view of additional components of the scanner of FIG. 1.

The output of electro-optical scanning mechanism 40 is passed via cable 27 through the back of mount unit 12. The cable optionally passes through an external switch 50, and then to a decoder 72 (FIG. 5).

The object sensor 30 emits a pulsating light beam depicted by line 5. An object 20 passing the pulsating beam will trigger operation of scanning mechanism 40.

The object sensor uses optical components to illuminate and receive reflections from a small area (or trigger area) inside or adjacent the scanning field of the scanner. An object that is introduced into this trigger area causes a change in the object sensor's received signal. The signal change is detected and triggers operation of the scanning mechanism 40. The optics of the sensor are independent of the scanner's optics, although they share a common exit window.

The circuitry and optics of the object sensor also provide an audible decode indicator (beeper), a visible scan and decode indicator (LEDs), and an external trigger interface.

Figure 2:
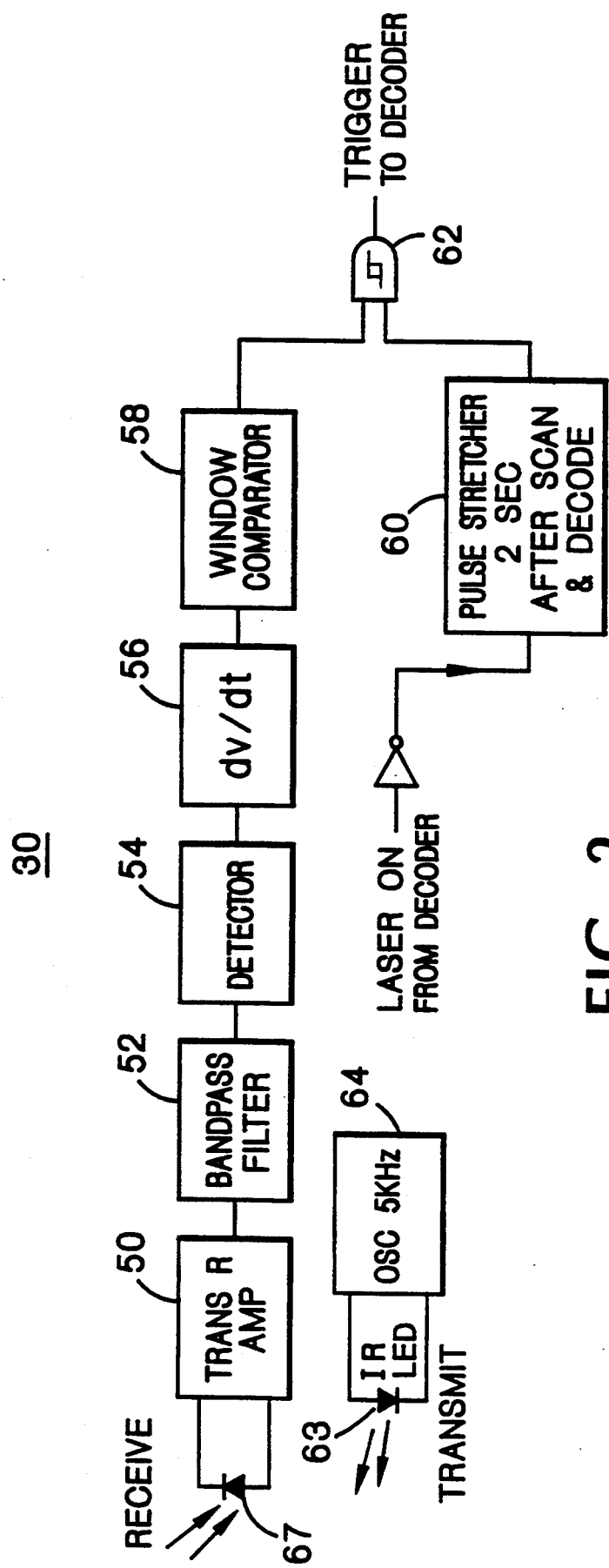
FIG. 2 is a block diagram of the circuitry of the object sensor portion of the embodiment of FIG. 1.

FIG. 2 shows the various portions of the object sensor 30. The transmit portion consists of an infra-red LED 63 (transmitting at 5 KHz), driven by an oscillator 64. The receive portion consists of a photodiode 67 connected to the input of transresistance amplifier 50. The received signal (a 5 KHz signal representing light reflected from the object) is filtered using a bandpass filter 52 (centered at 5 KHz, with Q=5). The output of the bandpass filter is fed to detector 54, which eliminates the carrier and leaves the baseband signal, which is then differentiated by differentiator 56. Taking the derivative of the baseband signal makes the object sensor insensitive to the static background level and sensitive only to the signal changes resulting from a moving object. The differentiated signal is fed to a window comparator 58, the output of which goes LOW for both positive and negative excursions of its input. The output signal of AND gate 62 is the Trigger signal to the decoder. The pulse stretcher 60 holds the Trigger signal LOW for a predetermined time (2 seconds) to prevent false triggers caused by object removal. This detection scheme makes it possible to detect both increases (white objects) and decreases (black objects) in the magnitude of the reflected signal.

Figure 3A:
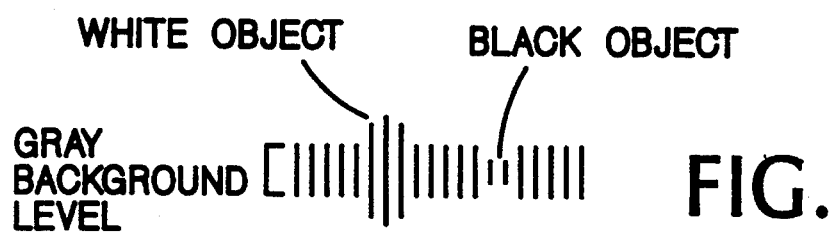
FIGS. 3a–3e shows the signal output at various stages of the circuit of FIG. 2.
Figure 3B:
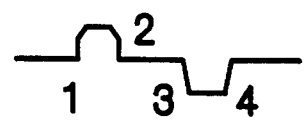
Figure 3C:
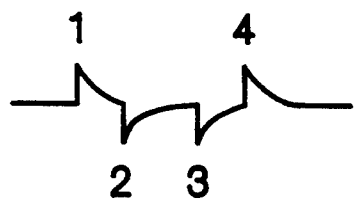
Figure 3D:
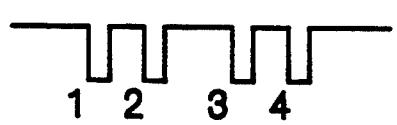
Figure 3E:
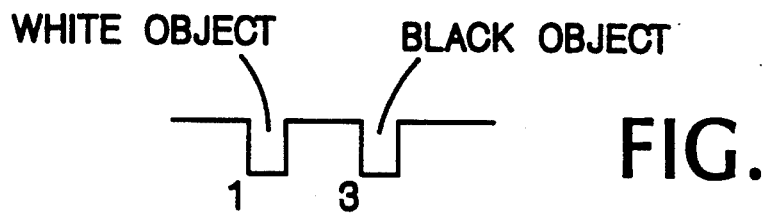

FIGS. 3(a)–3(e) show the signal at various points in the circuit of FIG. 2. FIG. 3(a) shows the output signal of bandpass filter 52; FIG. 3(b), the output signal of detector 54; FIG. 3(c), the output signal of differentiator 56; FIG. 3(d), the output signal of window comparator 58; and FIG. 3(e), the output signal of AND gate 62.

When a white object is introduced into the pulsating beam transmitted by the object sensor, the baseband signal derivative goes positive (edge 1 in FIG. 3(c)), and the output of window comparator 58 and the Trigger signal go LOW. The decoder responds by turning on scanning mechanism 40. This has the effect of causing the LASER ON signal (FIG. 2) to go HIGH. That, in turn, has the effect of holding the Trigger signal LOW, because AND gate 62 (FIG. 2) maintains the Trigger signal at that level after the output of window comparator 58 goes LOW. After a successful decode the scanner is turned off by the decoder (LASER ON goes LOW) and the object is removed (edge 2, FIG. 3). The pulse stretcher 60 holds the Trigger signal LOW for 2 seconds after LASER ON goes LOW. This prevents false triggers that would be caused by object removal (edge 2, FIG. 3). Sequencing is identical for a black object except that edge 3 (FIG. 3) (object introduction) initiates a scan episode.

Figure 4:
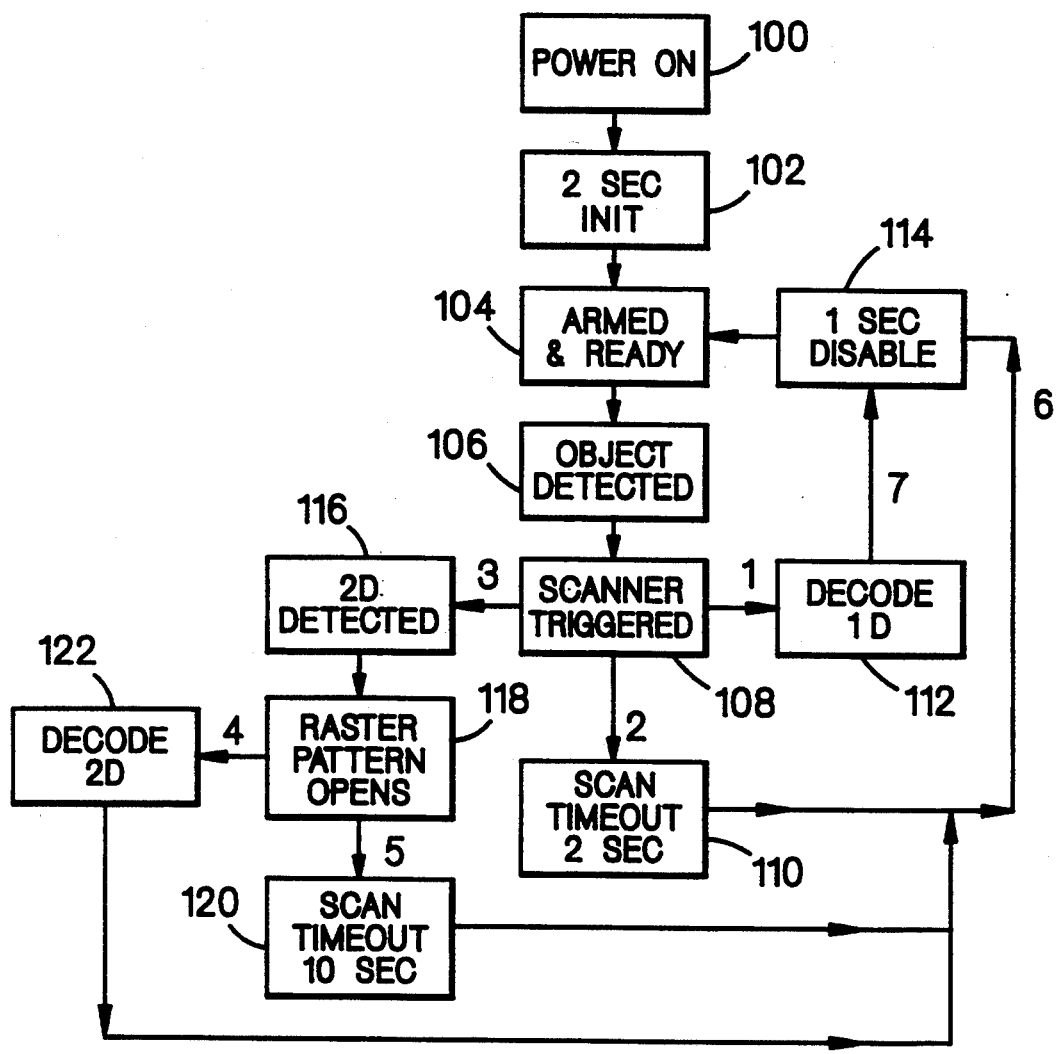
FIG. 4 is a flow diagram of the operation of the object sensor portion of the embodiment of FIG. 1.

FIGS. 4 and 5 show additional components of the scanner. Power unit 70 supplies power to decoder 72, which is connected to the wall-mounted scanner 10 by cable 27. Foot-operable switch 74 may optionally be connected to the cable.

FIG. 4 shows the flow of operations of the scanner. When power (from power unit 70) is applied (step 100) to the decoder 72, the object sensor 76 receives 5 V power and is initialized. When an object is detected (step 106), the decoder, under software control, dictates the amount of time that the scanner remains on. If the object is removed before a decode results (path 2) then the decoder will time-out after 2 seconds (step 110) and will turn off the scanner. The object sensor is then disabled (for 1 second) (step 114) to prevent false triggering while the object is being removed (path 6). The decoder will also time-out (step 110, path 2) if a decode does not result and/or a two-dimensional (2-D) symbol is not detected on the object.

If a one-dimensional (1-D) symbol is decoded (step 112, path 1) then the object sensor is disabled (for 1 second) (step 114, path 7) to avoid false triggering when the object is removed.

If a 2-D symbol is detected (step 116, path 3), then the raster scan pattern opens (step 118). If the 2-D symbol is not decoded (path 5), or if the object is removed before a decode is completed, the decoder will time-out (after 10 seconds) (step 120) which results in the object sensor being disabled (for 1 second) (step 114, path 6).

If a 2-D symbol is decoded (step 122, path 4), then the object sensor is disabled (for 1 second) (step 114, path 6).

The illumination source for the object sensor is a blinking infra-red LED 63 (5 KHz). The receiver comprises a photodiode 67 including an ambient light blocking filter. The detection range of the object sensor in this embodiment is approximately 8 inches, but larger ranges could be provided.

Object detection depends on the apparent optical contrast between the background and the object. Apparent optical contrast depends mostly on the relative distance between the object surface and the background surface (e.g., a table top), as well as the reflectivity of each surface. An object will only be detected by this embodiment of the object sensor if the magnitude of the received reflections from the object and the background differ by more than 10%, i.e., if the apparent object to background contrast is ±10%

The object sensor's ambient light immunity is 400 foot candles (fc) for incandescent, fluorescent, sodium vapor, and mercury lighting, and 2000 fc for sunlight.

As the object sensor detects an object by sensing changes in the reflected signal, the sensor can be fooled if an object is moving too slowly. For this reason an object introduction speed of 2 inches/sec (minimum) has been chosen. With changes in the design, this speed could be varied.

Other embodiments of the invention are within the scope of the following claims. For example, the object sensor and scanning unit 40 could use a common light source and light sensor.

I claim:

1. An optical scanning device for reading indicia of a type having regions of different light reflectivity, the device comprising:
   a base configured to be fixed to a surface;
   a structure movably connected to the base;
   a scanning unit supported on the structure and having a field of view in which indicia may be read, wherein the scanning unit comprises a first light source and a first light sensor;
   an object sensor supported on the structure and directed at a location within or nearby the field of view of the scanning unit, wherein the object sensor comprises a second light source directing a beam at a trigger area and a second light sensor receiving light reflected from the trigger area, the trigger area being within or nearby the field of view of the scanning unit, wherein introduction of an object into the trigger area causes a change in the light reflected from the trigger area and the second light sensor detects the change; and
   an electrical circuit connecting the object sensor and scanning unit;
   wherein the scanning unit and object sensor are movable in unison with the structure so that the object sensor remain directed at a location within or nearby the field of view of the scanning unit after movement of the structure relative to the base, and an object entering the field of view activates the scanning unit, causing it to attempt to read indicia on the object;
   wherein the electrical circuit comprises a differentiator that provides an electrical signal representative of the degree of change in the amount of reflected light and a window comparator that receives the output of the differentiator and provides an output to the scanning unit when the output of the differentiator is greater than a predetermined value, wherein caused by an increase or decrease in the amount of reflected light, so that the scanning unit is activated;
   wherein the electrical circuit connecting the object sensor to the scanning unit processes the electrical output of the scanning unit so that the scanning unit is temporarily deactivated when the object is removed from the field of view of the scanning unit.

2. The optical scanning device of claim 1 wherein the structure is pivotally connected to the base.

3. An optical scanning method for reading indicia of a type having regions of different light reflectivity, the method comprising the steps of:
   providing a scanning unit having a field of view in which indicia may be read, wherein the scanning unit comprises a first light source and a first light sensor;
   providing an object sensor directed at a location within or nearby the field of view of the scanning unit, wherein the object sensor comprises a second light source directing a beam at a trigger area and a second light sensor receiving light reflected from the trigger area, the trigger area being within or nearby the field of view of the scanning unit, wherein introduction of an object into the trigger area causes a change in the light reflected from the trigger area and the second light sensor detects the change;
   supporting the scanning unit and object sensor on a structure movably connected to a base configured to be fixed to a surface;
   moving the scanning unit and object sensor in unison with the structure; and
   electrically connecting the object sensor and scanning unit, including the steps of
   differentiating an output of the object sensor to provide an electrical signal representative of the degree of change in the amount of reflected light,
   processing the output of the differentiator through a window comparator that provides an output when the output of the differentiator is greater than a predetermined value, whether caused by an increase or decrease in the amount of reflected light, and
   activating the scanning unit in response to the output of the window comparator;
   wherein when an object that is more or less reflective than the background enters the field of view the scanning unit is activated, causing it to attempt to read indicia on the object;
   wherein the electrical circuit connecting the object sensor to the scanning unit processes the electrical output of the scanning unit so that the scanning unit is temporarily deactivated when the object is removed from the field of view of the scanning unit.

4. The optical scanning method of claim 3 wherein the structure is pivotally connected to the base.

5. An optical scanning method for reading indicia of a type having regions of different light reflectivity, wherein the indicia include both one and two-dimensional bar code symbols, the method comprising the steps of:
   providing a scanning unit having a field of view in which indicia may be read;
   providing an object sensor directed at a location within or nearby the field of view of the scanning unit;
   supporting the scanning unit and object sensor on a structure movably connected to a base configured to be fixed to a surface;
   moving the scanning unit and object sensor in unison with the structure; and
   electrically connecting the object sensor and scanning unit, including the steps of
   differentiating an output of the object sensor to provide an electrical signal representative of the degree of change in the amount of reflected light, processing the output of the differentiator through a window comparator that provides an output when the output of the differentiator is greater than a predetermined value, whether caused by an increase or decrease in the amount of reflected light, activating the scanning unit in response to the output of the window comparator, detecting whether the indicia is a one-dimensional or two-dimension bar code;

providing a long and a short scan timeout (maximum time interval for which scanning is activated); and selecting the long scan timeout if a two-dimensional bar code is detected, and the short scan timeout if a one-dimensional bar code is detected.

* * * * *